United States Patent [19]

Schils

[11] 4,413,393
[45] Nov. 8, 1983

[54] METHOD OF MANUFACTURING A VALVE ASSEMBLY

[75] Inventor: Petrus J. R. Schils, Breda, Netherlands

[73] Assignee: Keystone International, Inc., Houston, Tex.

[21] Appl. No.: 227,428

[22] Filed: Jan. 22, 1981

Related U.S. Application Data

[62] Division of Ser. No. 887,513, Mar. 17, 1978, Pat. No. 4,275,867.

[30] Foreign Application Priority Data

Mar. 17, 1977 [NL] Netherlands ............... 7702881

[51] Int. Cl.³ .............. B23P 15/00; F16K 31/00
[52] U.S. Cl. ................... 29/157.1 R; 29/434; 29/436; 74/531
[58] Field of Search ............ 29/157.1 R, 157.1 A, 29/434, 436, 453; 251/214, 297, 288, 305, 306, 308, 312, 315–317; 403/282, 359; 74/531

[56] References Cited

U.S. PATENT DOCUMENTS

| | | | |
|---|---|---|---|
| 1,611,940 | 12/1926 | Ohmer | 251/297 |
| 2,415,497 | 2/1947 | Johnson | 74/531 |
| 2,506,098 | 5/1950 | Melichar | 251/297 |
| 2,529,572 | 11/1950 | Raybould | 251/308 |
| 3,053,118 | 9/1962 | Lavallee | 76/108 R |
| 3,155,368 | 11/1964 | Shafer | 29/157.1 R |
| 3,173,462 | 3/1965 | Koeppel | 145/61 C |
| 3,306,572 | 2/1967 | Dove | 251/297 |
| 3,314,644 | 4/1967 | Dwyer et al. | 29/157.1 R |
| 3,656,714 | 4/1972 | Peterson | 29/157.1 R |
| 3,751,003 | 8/1973 | Kass | 251/297 |
| 3,770,033 | 11/1973 | Gavillet et al. | 145/61 C |
| 3,819,149 | 6/1974 | Kinder | 251/315 |
| 4,025,050 | 5/1977 | Manki et al. | 251/306 |
| 4,038,734 | 8/1977 | Goldman | 29/157.1 R |
| 4,049,020 | 9/1977 | Neveux | 251/297 |
| 4,076,437 | 2/1978 | Mazzolla | 74/531 |

Primary Examiner—Daniel C. Crane
Attorney, Agent, or Firm—Browning, Bushman, Zamecki & Anderson

[57] ABSTRACT

A disc-type valve assembly and method of making same. The assembly includes a valve body having a flowway with a disc-like valve element therein. A shaft has an inner portion directly rigidly connected to the valve element by a pre-stressed self-connection and an outer portion rotatably mounted in the valve body. A handle is directly rigidly connected to the outer portion of the shaft by a pre-stressed self-connection whereby the handle and shaft form a rotating body. A positioning sleeve is interposed in tight pre-stressed relation between the valve body and the rotating body for preventing relative rotation between the bodies under torque loads below a pre-determined magnitude, the positioning sleeve being yieldable under torque loads greater than or equal to that magnitude to permit such rotation.

13 Claims, 6 Drawing Figures

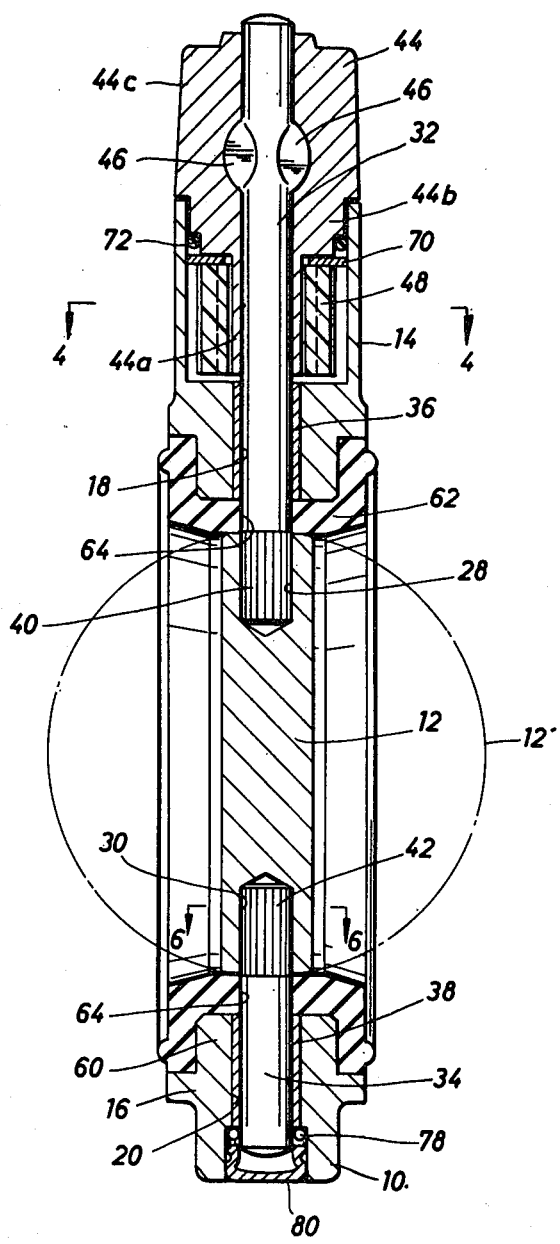
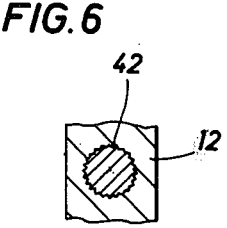
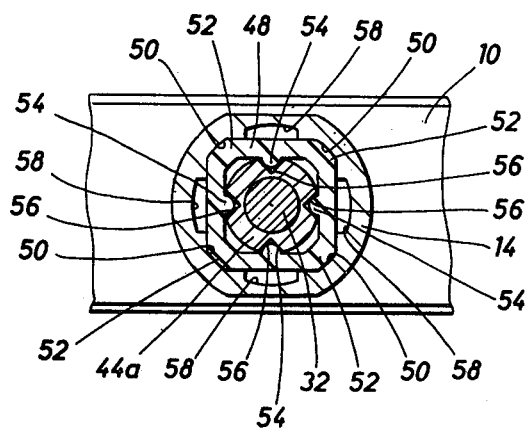
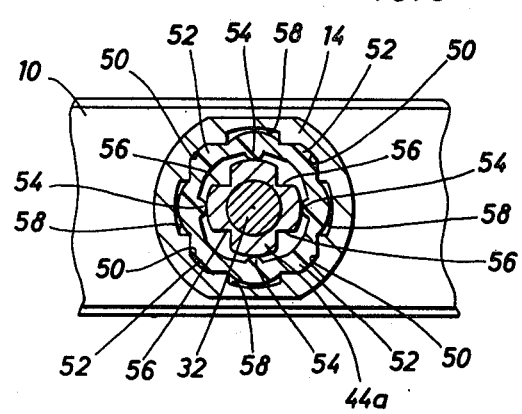

METHOD OF MANUFACTURING A VALVE ASSEMBLY

This is a division of application Ser. No. 887,513, filed Mar. 17, 1978, now U.S. Pat. No. 4,275,867.

BACKGROUND OF THE INVENTION

1. Field of the Invention

The present invention pertains to disc-type valves generally comprising a generally tubular valve body and a disc-like valve element disposed in the flowway formed by the valve body and rotatable about an axis transverse to that of the flowway to open and close the flowway. Rotating with the valve element are a shaft or a pair of stub shafts mounted in the valve body and an operating handle. A positioning member or assembly is provided and the handle can be latched to the positioning member to hold the handle, shaft, and valve element in any one of a number of positions.

2. Description of the Prior Art

In prior art valves of this type, the various rotating parts are typically connected to one another by connection members such as keys, pins, screws, non-circular drive components, etc. for joint rotation. This permits shipment of the valve in disassembled form, assembly in the field, and disassembly and re-assembly for maintenance purposes. However, this conventional approach also introduces problems. In particular, the above-described means of connection of the rotating parts involves a high degree of susceptibility to undue play between the parts. This is compounded by play between the handle and positioning means when the two are latched together to hold the valve in a given position. In an attempt to combat this effect, precisely controlled machining procedures have been used, and these increase the cost of manufacture of the valve. Also, special tools are required to tighten the connections between the parts after they have been assembled by hand by the user. This further increases the expense as well as the installation time.

Other problems are introduced by the fact that there must be some clearance between the rotating parts to permit hand assembly. Furthermore, the use of connecting members such as keys, pins, etc. increases the number of parts. Thus in opening and closing the valve, torsional leads are carried by the connecting members across the clearances. This weakens the assembly, for example by reducing the capability of the disc, carried by the shaft, to act as a beam in closed position. During use, and particularly disassembly and re-assembly, the parts become worn thereby increasing the clearances. The problem is further complicated by the fact that the clearances tend to compound vibrations caused by turbulent, high velocity flow. The result may be premature valve wear and even catastrophic failure.

SUMMARY OF THE INVENTION

The present invention provides for relatively permanent factor assembly of a disc-type valve whereby the above problems associated with manual field assembly, clearances between parts, etc. are virtually eliminated. In particular, the rotating parts are minimized in number and are connected to one another by rigid, pre-stressed self-connections whereby the rotating parts act as one integral piece. Additionally, a positioning means is interposed in tight pre-stressed relation between the valve body and the rotating parts for preventing relative rotation therebetween under torque loads below a pre-determined magnitude, the positioning means being yieldable under torque loads greater than or equal to that magnitude to permit such rotation.

In the preferred embodiments of the invention, the shaft member has a knurled end which is forced into a radial bore in the valve element deforming the material of the valve element whereby mating spline structures are formed. The handle is molded about the shaft member, torque-transmitting surfaces having been preformed on the exterior of the shaft member.

The positioning member preferably takes the form of a deformable sleeve disposed in a radial passageway through the valve body communicating with the valve flowway. The rotating body comprised of the shaft member and the handle is inserted into this passageway to wedge the sleeve between itself and the valve body.

The present invention eliminates the necessity for field assembly of the valve. At the same time, the self-connections of the various parts eliminates the use of keys, pins, etc. The factory assembly, together with the elimination of connecting elements such as keys, etc. allow clearances between the parts to be virtually eliminated without the need for expensive precision machining operations. The elimination of clearances significantly alleviates problems normally associated with wear and vibration and increases the strength and beam capacity of the combination of rotating parts.

It is thus a principal object of the present invention to provide an improved disc-type valve assembly.

A further object of the invention is to provide a valve assembly having rigid pre-stressed self-connections between the parts.

Another object of the present invention is to provide a permanent factory assembled valve.

Still another object of the invention is to eliminate clearances and connecting elements between rotating parts of a valve.

Yet another object of the present invention is to provide a method for permanent factory assembly of a valve with rigid pre-stressed self-connections between the rotating parts.

Still other objects, features, and advantages of the present invention will be made apparent by the following description of the preferred embodiments the drawings and the claims.

BRIEF DESCRIPTION OF THE DRAWINGS

FIG. 3 is a cross-sectional view taken on lines 3—3 of FIG. 1.

FIG. 4 is a cross-sectional view taken on lines 4—4 of FIG. 3.

FIG. 5 is a view similar to FIG. 4 showing the parts intermediate closed and open valve positions.

FIG. 6 is a cross-sectional view taken on lines 6—6 of FIG. 3.

DESCRIPTION OF THE PREFERRED EMBODIMENT

Figure 1:
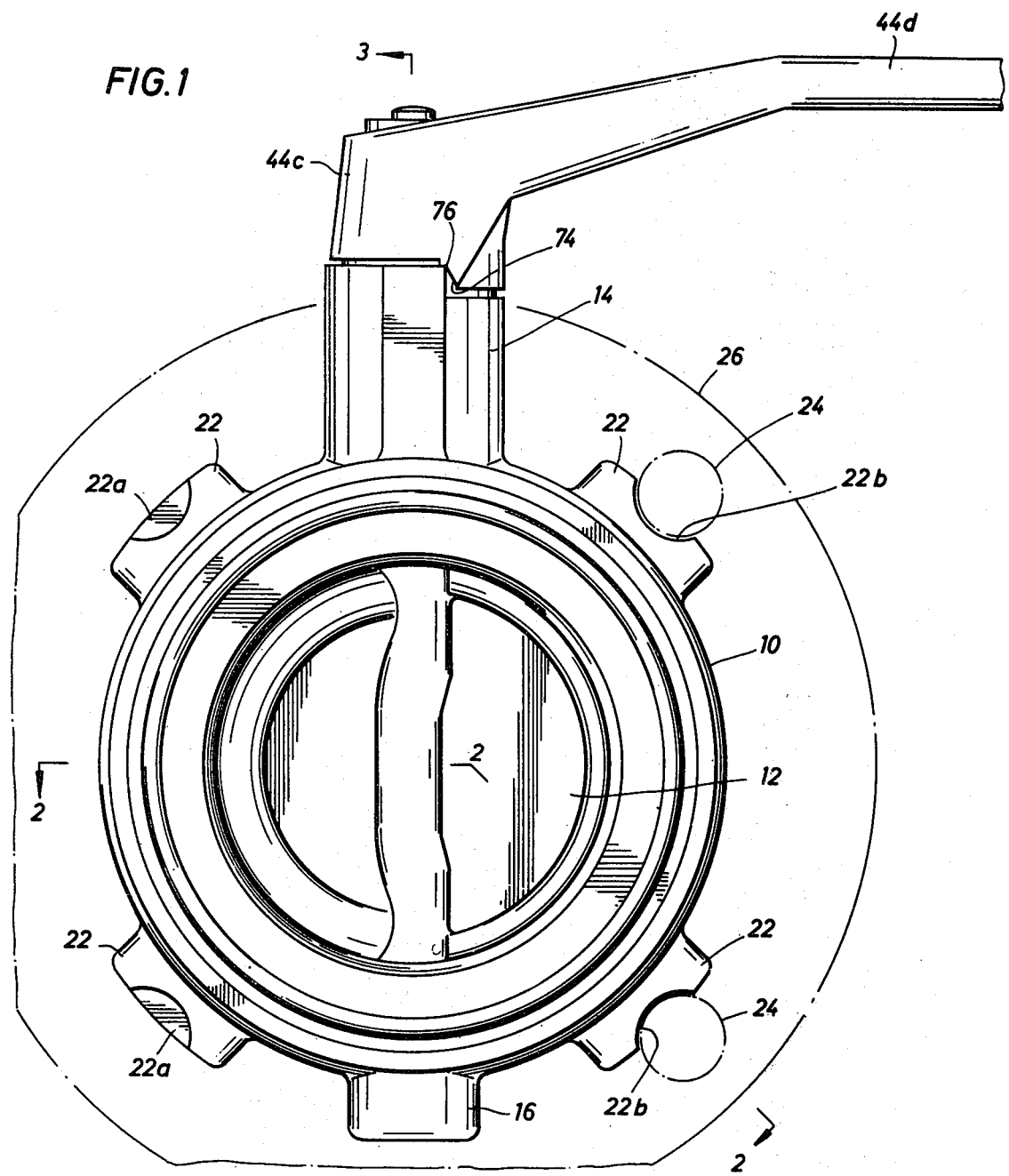
FIG. 1 is an end elevational view of a valve according to the present invention in closed position.

Referring now to the drawing, the valve assembly of the present invention comprises a generally tubular valve body 10 having a flowway therethrough. A disc-type valve element 12 is rotatably mounted in the flowway in a manner to be described more fully below.

Figure 2:
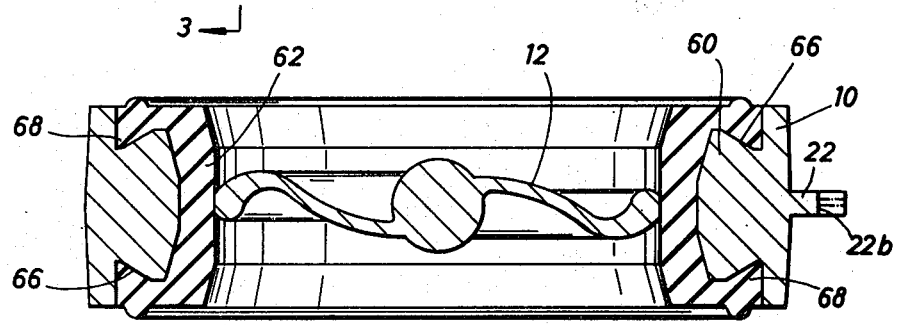
FIG. 2 is a cross-sectional view taken on lines 2—2 of FIG. 1.

Valve element 12 is shown in closed valve position in solid lines in FIGS. 1-3 wherein it lies transverse to the flowway. The disc can rotate about an axis extending transversely across the flowway to the open valve position sown in phantom at 12' in FIG. 3 wherein it lies generally parallel to the axis of the flowway. The valve body 10 includes a pair of diametrically opposed radial projections 14 and 16 through which respective passageways 18 and 20 extend into the flowway. Valve body 10 also has a plurality of flanges 22 extending radially outwardly therefrom, and each flange includes a frangible web 22a having the configuration of a circular segment. The webs 22a may be broken out when the valve is installed in a pipe line or the like. Bolts or the like may then be received in the arcuate recesses 22b formed when the webs are broken out to mount the valve between opposed flange fittings. In FIG. 1, two of the flanges 22 are shown with the webs 22a in place, and two of the flanges 22 are shown with the webs broken out, bolts 24 received in the recesses 22b and a flange fitting 26 being shown in phantom.

The valve element 12 has a pair of diametrically oppositely directed bores 28 and 30 extending radially thereinto. The valve element 12 is positioned in the flowway of the valve body with each of the bores 28 and 30 aligned with a respective one of the radial passageways 18 and 20 through the valve body. A pair of stub shafts 32 and 34 are rotatably mounted in respective ones of the passageways 18 and 20 by journal sleeves 36 and 38 disposed in the respective passageways adjacent the flowway. The shafts 32 and 34 have respective knurled ends 40 and 42 received in bores 28 and 30 respectively. As will be described more fully below, the ends 40 and 42 are forced by press-fitting into the bores 28 and 30 whereby the relatively soft metal of the valve element 12 in the vicinity of the bores is deformed to mate with the knurled ends 40 and 42 of the shafts as shown in FIG. 6. Thus the mating surfaces of the shaft ends and the valve element act as spline structures to transmit torque from the shafts to the valve element without relative rotation therebetween although they do not, due to the tight press fit, permit relative longitudinal movement of the shafts with respect to the valve element as many splines do. The press fit between the shafts and the valve element constitutes a rigid, pre-stressed self-connection, i.e. relative movement between the two elements is precluded, there is no clearance such as to permit play between the connected element, and no third element is necessary to rigidly connect them.

A handle 44 is molded about the end of shaft 32 distal the valve flowway. Handle 44 has a shank including small diameter portion 44a, an intermediate portion 44b and a large diameter portion 44c. A gripping arm 44a extends from one side of portion 44c. The end of shaft 32 about which the handle 44 is molded has a plurality of radially projecting upsets 46 on its exterior. When the handle 44 is molded about the shaft 32, its interior is thus made to conform to the configuration of the upsets 46, whereby the upsets 46 and the mating surfaces of the handle 44 serve to transmit torque from the handle to the shaft. Since the connection between handle 44 and shaft 32 is by molding, it too is a rigid, pre-stressed self-connection. The interconnected shaft 32 and handle 44 together will be referred to herein as a "rotating body."

The passageway 18 has a small diameter portion adjacent the valve flowway which receives the journal sleeve 36, the sleeve in turn receiving and rotatably mounting the portion of shaft 32 intermediate the end 40 and the end about which the handle is molded. Passageway 18 also has a large diameter portion which receives the small and intermediate portions 44a and 44b of the handle 44. A polyurethane positioning sleeve 48 is disposed in the large portion of the passageway 18 to receive and surround the small diameter portion 44a of the handle. The large diameter portion 44c of the handle 44 extends outwardly of the valve body 10.

As best seen in FIG. 4, the outer surface of the positioning sleeve 48 is generally polygonal, specifically square, in cross section. The inner surface of the projection 14 which defines the passageway 18 has a plurality of recesses 50 configured to matingly receive the corners 52 of the square generally formed by the outer surface of sleeve 48. The corners 52 and recesses 50 thus serve as retainer formations to prevent relative rotation between the positioning sleeve 48 and the projection 14 of the valve body 10.

The inner surface of positioning sleeve 48 includes a plurality of projections 54 projecting inwardly and extending longitudinally along the sleeve 48. The outer surface of the small diameter portion 44a of handle 44 has a plurality of grooves or depressions 56 sized and spaced so that each depression 56 may receive a respective one of the projections 54. The inner surface of the projection 14 of the valve body 10 which defines the passageway 18 has a plurality of concavities 58 each disposed opposite a respective one of the projections 54.

The positioning sleeve 48 is sized so that it will be tightly wedged in pre-stressed relation between the projection 14 of the valve body and the handle portion 44a, i.e. so that there is no play between the parts. Under torque loads below a predetermined magnitude, the projections 54 and depressions 56 act as detent formations to prevent relative rotation between the rotating body 32, 44 and the valve body. However, when the torque load reaches or exceeds this magnitude, as when an operator begins to turn the handle, the portions of the sleeve 48 adjacent the projections 54 may be deformed outwardly into the concavities 58 as shown in FIG. 5 to permit the rotating body 32, 44 and the attached valve element and shaft 34 to be moved from open to closed position or vice versa. Thus FIG. 5 represents the positions of the parts during such movement at a point halfway between closed and open positions. The resiliency of the sleeve 48 allows the projections 54 to move back into the depressions 56 when the movement is complete to once again hold the rotating parts in the desired position. The handle 44 and valve body projection 14 have engageable stop surfaces 74 and 76 (see FIG. 1) to limit rotation to 90°.

Valve body 10 has an annular radially inwardly projecting rib 60 on which an annular valve seat 62 is mounted. Seat 62 lines the valve flowway and provides a seal against the valve element 12 when the latter is in closed position. The valve seat 62 has a pair of radial holes 64 therethrough for receipt of the shafts 32 and 34. Except in the area adjacent the shafts 32 and 34, the rib 60 is axially undercut on each side as shown at 66 and the valve seat includes portions 68 projecting into the undercut areas to help retain the seat in place. (See FIG. 2) The undercut areas also lighten the valve body.

FIG. 2 also best illustrates the transverse cross-sectional configuration of the valve element. It can be seen that the valve element has concavities in its faces. However, a conventional disc with substantially planar faces, as well as other types of disc's, could be used.

A preferred method of assembly of the valve is as follows:

The valve seat 62 and valve element 12 are emplaced in the valve flowway, and journal sleeves 36 and 38 are emplaced in the passageways 18 and 20. Positioning sleeve 48 is then inserted in the large diameter portion of passageway 18, and an annular spacer ring 70 inserted after it. Handle 44 is molded about shaft 32 to form the rotating body either before, during or after the above steps. An O-ring seal 72 is placed around an undercut area of intermediate portion 44b of the handle shank. The rotating body 32, 44 is inserted into passageway 18, and the shaft 34 is inserted into passageway 20, the knurled ends 40 and 42 of the shafts being press fitted into the bores 28 and 30 of the valve element. Finally an O-ring seal 78 is placed around the end of shaft 34 distal the valve element 12, and a plug 80 is placed in the outer end of passageway 20.

The valve is thus permanently assembled at the factory and shipped to the user. To install the valve it is merely necessary to break out the webs 22a and bolt the valve between flange fittings such as 26. The rotating parts are connected together by rigid, pre-stressed self-connections as described above so that no tightening is necessary. Furthermore, the positioning sleeve 48 is tightly wedged in pre-stressed relation between the valve body and rotating body eliminating play between the two. Thus in use, vibration and wear problems are substantially reduced. Additionally, the valve is strong and reliable, particularly due to the lack of rotational play between the parts substantially increasing the beam strength of the valve element 12 and connected shafts 32 and 34. At the same time it can be seen that the need for machining of the various parts to close tolerances is not necessary to accomplish these results whereby the manufacturing cost is reduced. In particular, the press-fitting of the knurled ends of shafts into the valve element eliminates the necessity of such machining of these parts, the molding of the handle onto the shaft 32 eliminates machining of thereof, and the wedging of the deformable polyurethane between the valve body and rotating body precludes the need for close tolerances between these three parts. Cost of manufacture is decreased further and valve strength increased by the elimination of extraneous connecting members such as pins, keys, etc.

It will also be seen that numerous modifications of the preferred valve and method described above may be made without departing from the spirit of the invention. The types of pre-stressed self-connections might be varied; the handle, for example might be press-fitted to the shaft rather than molded thereon. Changes might also be made in the positioning means. It might take the form of several inserts circumferentially spaced about the passageway in the valve body rather than that of one continuous sleeve. It might also be modified so that the positioning means would rotate with the rotating body and the detent formations would be formed on the positioning means and valve body. Furthermore, the relation of the handle and shaft to the other parts of the valve might be changed, the detent formations, for example, being formed on the shaft rather than on the handle. Still other modifications might involve changes in the configuration of various parts such as the valve body, valve element, etc. In less preferred embodiments, pre-stressed self-connections might be provided only between the disc and shaft members and not between the shaft member and handle, or vice versa. It is thus intended that the scope of the invention be limited only by the claims which follow.

I claim:

1. A method of making a disc-type valve assembly comprising:

emplacing an integral positioning sleeve formed of resilient material generally coaxially within a radial passageway extending from a flowway in a tubular valve body, said sleeve and said valve body being formed with retainer formations wherein one of said sleeve and valve body is formed with radially projecting retainer formations and the other of said sleeve and valve body is formed with radially receiving retainer formations, said retainer formations being radially formed with respect to said sleeve, said sleeve being so emplaced as to interengage said retainer formations;

emplacing a disc-like valve element in the flowway of said valve body;

connecting a handle to a shaft member to form a rotating body;

inserting one end of said shaft member through said positioning sleeve in said radial passageway of said valve body and into engagement with said valve element and thereby wedging said positioning sleeve radially-with respect to itself-in tight prestressed relation between said valve body and said rotating body such that said rotating body is rotatably mounted with respect to said valve body and interengaging detent formations formed on said sleeve and rotating body wherein one of said sleeve and rotating body is formed with radially projecting detent formations and the other of said sleeve and rotating body is formed with radially receiving detent formations, said detent formations being radially formed with respect to said sleeve and said rotating body.

2. The method of claim 1 wherein said one end of said shaft member is so inserted into direct rigid self-connecting relationship with said valve element.

3. The method of claim 2 wherein said handle is directly rigidly connected to said shaft member by a pre-stressed self-connection.

4. The method of claim 3 wherein a first radial bore in said valve element is aligned with said passageway through said valve body when said valve element is emplaced in said flowway, and wherein said one end of said shaft member is press-fitted into said bore.

5. The method of claim 4 wherein spline structures are pre-formed on said one end of said shaft member prior to insertion into said passageway, and wherein mating spline structures are formed in said valve element by deformation of said valve element upon insertion of said one end of said shaft member into said bore.

6. The method of claim 5 including aligning two such radial bores in said valve element with respective ones of two such passageways in said valve body upon emplacement of said valve element, and inserting two such shaft members through respective ones of said passageways and into respective ones of said bores.

7. The method of claim 3 wherein said handle is connected to said shaft member by molding said handle in surrounding relation to said shaft member.

8. The method of claim 7 wherein torque-transmitting formations are formed on the exterior of said shaft member prior to molding of said handle.

9. The method of claim 1 wherein said retainer formations are interengaged so as to prevent relative rotation between said sleeve and said valve body and said detent formations are interengaged so as to limit relative rotation between said sleeve and said rotating body under torque loads below a given magnitude, the degree of resiliency of said positioning sleeve being substantially greater than those of said bodies whereby said positioning sleeve is deformable under torque loads greater than or equal to said magnitude to permit relative rotation between said sleeve and said rotating body.

10. The method of claim 9 wherein the formation of said detent formations includes forming radial projections on said positioning sleeve and radial depressions in said rotating body, and further including the formation of radial concavities of said valve body opposite said projections for receipt of said positioning sleeve upon relative rotation between said positioning sleeve and said rotating body.

11. The method of claim 10 wherein said handle is connected in circumferentially surrounding relation to said one end of said shaft member, a portion of said handle is inserted in said passageway, and said radial depressions are formed on said handle.

12. The method of claim 11 including journalling a part of said shaft member intermediate its ends in said passageway.

13. The method of claim 2 including lining said flowway with an annular valve seat prior to emplacement of said valve element.

* * * * *